US010364390B2

(12) United States Patent
James et al.

(10) Patent No.: US 10,364,390 B2
(45) Date of Patent: Jul. 30, 2019

(54) HIGH DENSITY FAST PHOSPHOR FOR ELECTRON MICROSCOPY (71) Applicant: Gatan, Inc., Pleasanton, CA (US)

(72) Inventors: Edward Michael James, San Francisco, CA (US); Colin Geoffrey Trevor, Pleasanton, CA (US); Joseph Webster, Castro Valley, CA (US); David Joyce, Livermore, CA (US); Nerine Cherepy, Piedmont, CA (US); Steven A. Payne, Castro Valley, CA (US); Zachary M. Seeley, Livermore, CA (US)

(73) Assignees: Gatan, Inc., Pleasanton, CA (US); Lawrence Livermore National Secutity, LLC, Livermore, CA (US)

( * ) Notice: Subject to any disclaimer, the term of this patent is extended or adjusted under 35 U.S.C. 154(b) by 0 days.

(21) Appl. No.: 16/204,295

(22) Filed: Nov. 29, 2018

(65) Prior Publication Data

US 2019/0161676 A1 May 30, 2019

Related U.S. Application Data (60) Provisional application No. 62/597,499, filed on Dec. 12, 2017, provisional application No. 62/592,895, filed on Nov. 30, 2017.

(51) Int. Cl.
*C09K 11/77* (2006.01)
*G01T 1/202* (2006.01)
(52) U.S. Cl.
CPC ...... *C09K 11/7777* (2013.01); *C09K 11/7769* (2013.01); *C09K 11/7774* (2013.01); *G01T 1/2023* (2013.01)

(58) Field of Classification Search
CPC ............ C09K 11/7774; C09K 11/7787; C09K 11/7746; C09K 11/7769; C09K 11/7776; C09K 11/7777; G01T 1/2023
See application file for complete search history.

(56) References Cited

U.S. PATENT DOCUMENTS

| | | | |
|---|---|---|---|
| 7,252,789 | B2 | 8/2007 | Venkataramani et al. |
| 7,785,490 | B2 | 8/2010 | Ikada et al. |
| 7,834,319 | B2 | 11/2010 | Muenchausen et al. |

(Continued)

OTHER PUBLICATIONS

Tyrrel, G. C.: Phosphors and scintillators in radiation imaging detectors. Nuclear Instruments and Methods in Physics Research A 546 (2005) pp. 180-187.

(Continued)

*Primary Examiner* — David P Porta
*Assistant Examiner* — Fani Boosalis
(74) *Attorney, Agent, or Firm* — Snyder, Clark, Lesch & Chung, LLP (57) ABSTRACT A fast-decaying, dense phosphor having relatively high light emission is described. Through a combination of material selection, growth and deposition technique, phosphor thin films are made that preserve the necessary light output when used in thin-films, unlike common fast phosphors, such as P-46, P-47, and also have an afterglow that decays much faster than common bright phosphors, such as P-43. Use of the phosphor is described in applications where acquiring many frames/images very quickly is required.

25 Claims, 13 Drawing Sheets (56) References Cited

U.S. PATENT DOCUMENTS

| | | | |
|---|---|---|---|
| 8,461,535 B2 | 6/2013 | Kuntz et al. | |
| 8,815,122 B2 | 8/2014 | Nakamura et al. | |
| 8,969,812 B2 | 3/2015 | Yoshikawa et al. | |
| 9,193,903 B2 * | 11/2015 | Hayashi | A61B 6/03 |
| 2012/0145962 A1 | 6/2012 | Fukuta et al. | |
| 2015/0275080 A1 | 10/2015 | Ronda et al. | |

OTHER PUBLICATIONS

Höß, P. et al.: Response of very fast decay phosphors in image intensifier tubes for CCD readout devices. Proc. SPIE 4183, 24th International Congress on High-Speed Photography and Photonics (Apr. 17, 2001). 6 pages.

Z. M. Seeley et al.: Homogeneity of Gd-based garnet transparent ceramic scintillators for gamma spectroscopy. Journal of Crystal Growth. vol. 379. Nov. 28, 2012 (Nov. 28, 2012), pp. 79-83.

M. Kucera et al.: Scintillation response of Ce3+doped GdGa—LuAG multicomponent garnet films under e-beam excitation. Journal of Liminescence. vol. 169. Jan. 21, 2015 (Jan. 21, 2015), pp. 674-677.

P. Prusa et al.: Scintillation properties of the Ce-doped multicomponent garnet epitaxial films. Optical Materials. vol. 35. No. 12. Jul. 19, 2013 (Jul. 19, 2013), pp. 2444-2448.

S. Chen et al.: Fabrication of Ce:(Gd2Y)(Ga3Al2)O12 scintillator ceramic by oxygen-atmosphere sintering and hot isostatic pressing. Journal of the European Ceramic Society. vol. 37. No. 10. Apr. 10, 2017 (Apr. 10, 2017). pp. 3411-3415.

* cited by examiner

Figure 11

HIGH DENSITY FAST PHOSPHOR FOR ELECTRON MICROSCOPY

CROSS REFERENCE TO RELATED APPLICATIONS

This non-provisional application claims priority to U.S. Provisional Patent Application No. 62/592,895 filed Nov. 30, 2017 and to U.S. Provisional Patent Application No. 62/597,499 filed Dec. 12, 2017. Both applications are entitled "High Density Fast Phosphor for Electron Microscopy." The entire disclosures of these provisional applications are incorporated herein by reference.

BACKGROUND

Figure 1:
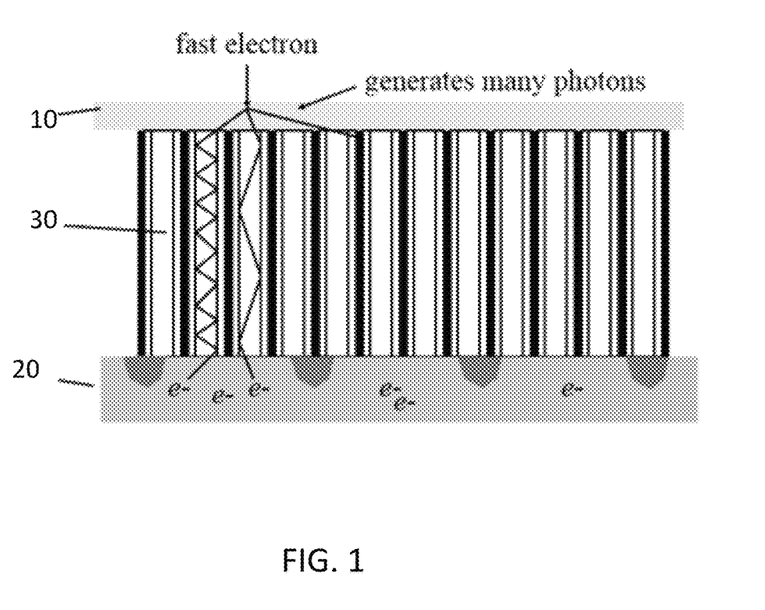
FIG. 1 is a cross section of an electron detector.
Figure 2A:
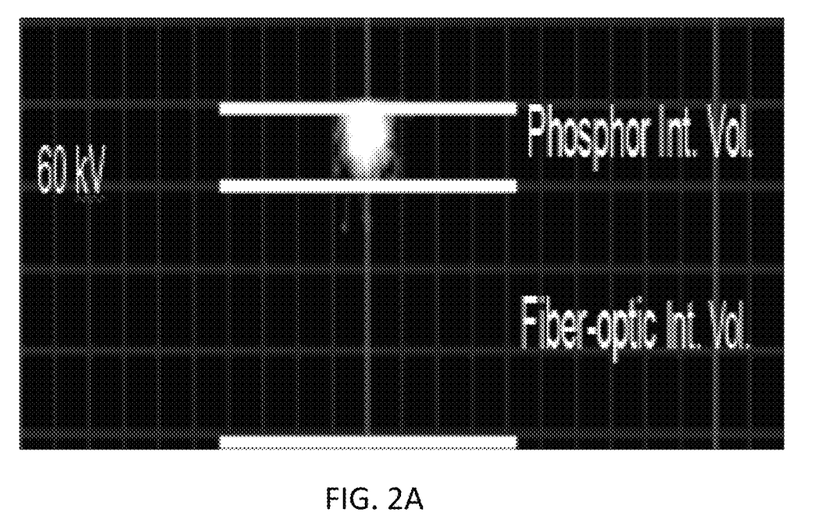
FIG. 2A is a simulated path of electrons at 60 keV.
Figure 2B:
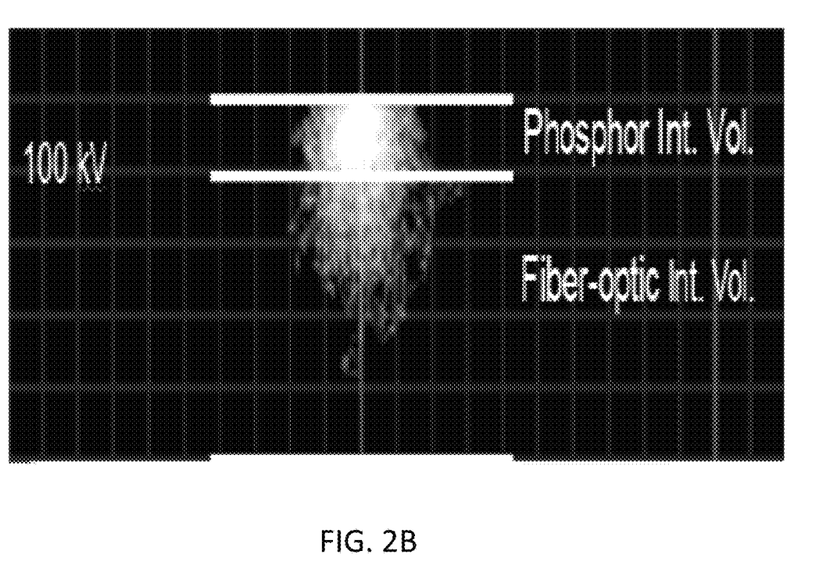
FIG. 2B is a simulated path of electrons at 100 keV.
Figure 2C:
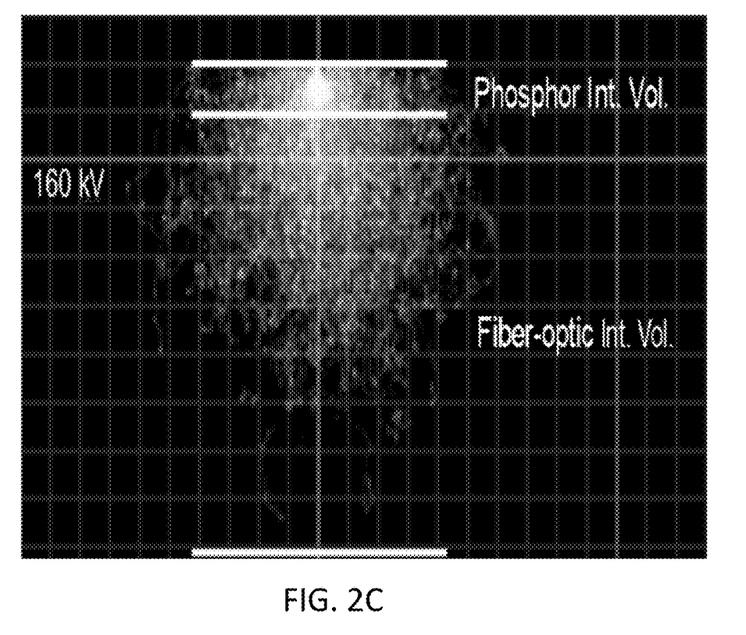
FIG. 2C is a simulated path of electrons at 160 keV.
Figure 2D:
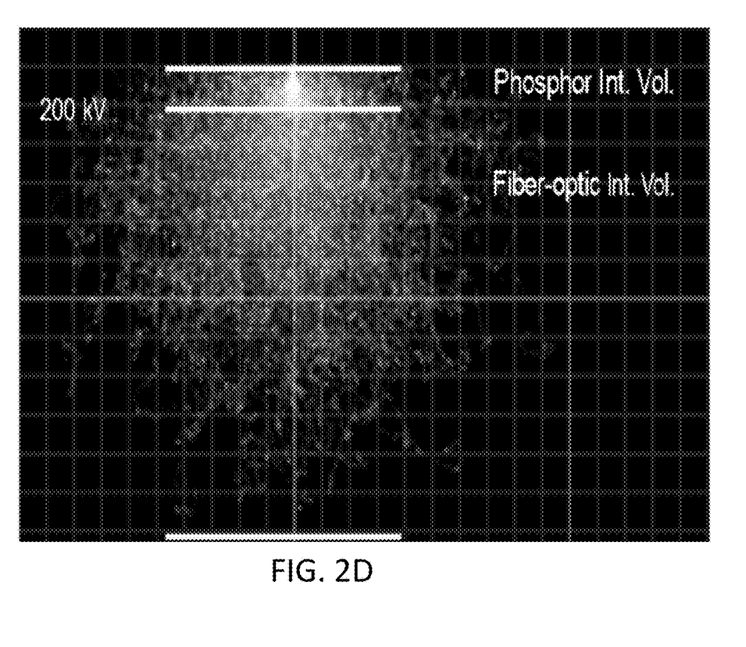
FIG. 2D is a simulated path of electrons at 200 keV.
Figure 2E:
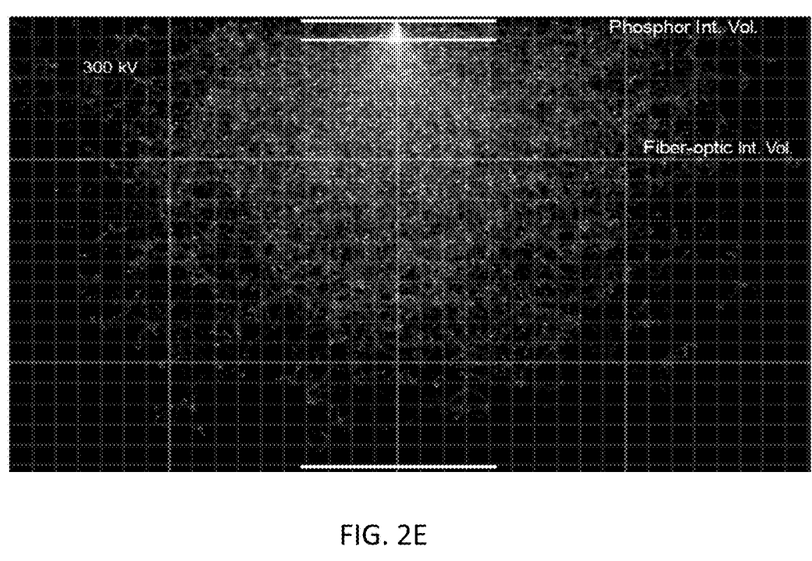
FIG. 2E is a simulated path of electrons at 300 keV.

Electron microscopes use a beam of accelerated electrons, which pass through or are deflected by a sample to provide an electron image and/or diffraction pattern of the sample. To provide a record of these images and/or diffraction patterns, at least a portion of the kinetic energy of the electrons is converted into another form of energy which can be measured and permanently stored. For example, light images are generated by impinging the electrons onto scintillator materials (e.g., phosphors). In this application, "scintillator" and "phosphor" are used interchangeably to mean a material that emits light when excited by ionizing radiation (electron, gamma ray, etc.) As shown in FIG. 1, a scintillator 10 forms light images and/or patterns that may be captured on a two-dimensional imaging sensor 20 via a fiber array 30. The imaging sensor may be a charge coupled device (CCD) or a CMOS imaging detector. The output from the imaging sensor may be read as an analog signal, converted to a digital format by an analog to digital converter, and displayed on a video monitor and/or stored permanently.

Once an accelerated electron enters the solid volume of a detector (scintillator) it starts to lose energy to the solid. The rate of energy loss depends on the initial energy of the electron and the solid material through which it is traveling. The electron is also scattered randomly by the fields surrounding the atoms of the detector in a manner which alters the electron's direction or path of travel. The result is that a series of accelerated electrons of the same initial energy, entering the solid detector at a specific point, will generate a set of paths which together fill a region of space resembling a pear-shaped cloud, see FIGS. 2A-2E, which show simulated paths of electrons at 60 keV, 100 keV, 160 keV, 200 keV and 300 keV, respectively, as they scatter in the scintillator and continue scattering in the substrate. As shown, the beam scatters through the high-density scintillator layer between the two white lines at the top. The electron then proceeds through the lower density fiber optic substrate, and the scattering density is reduced (e.g. the electron mean free path is increased in the fiber optic substrate as compared to the scintillator layer). The relevant information is contained in the light produced inside the bright region in the scintillator just below where the electron impinges. This region must be kept small in all three dimensions. The volume of the scatter region can be defined as the envelope of all possible paths and is termed the interaction volume of the electron beam in the detector. The energy of the electron beam and the average atomic number density (Z density) of the detector material (i.e. the phosphor) together determine the electron path's average behavior and thus the size and shape of the interaction volume.

Higher electron energies cause the interaction volume to be larger, while denser materials in the detector will cause it to be smaller. The interaction of high energy electrons with the volume of the solid material of the detector generates spreading and noise which constitute primary limitations on the amount of spatial and intensity information obtainable from the incident electron image.

Figure 3:
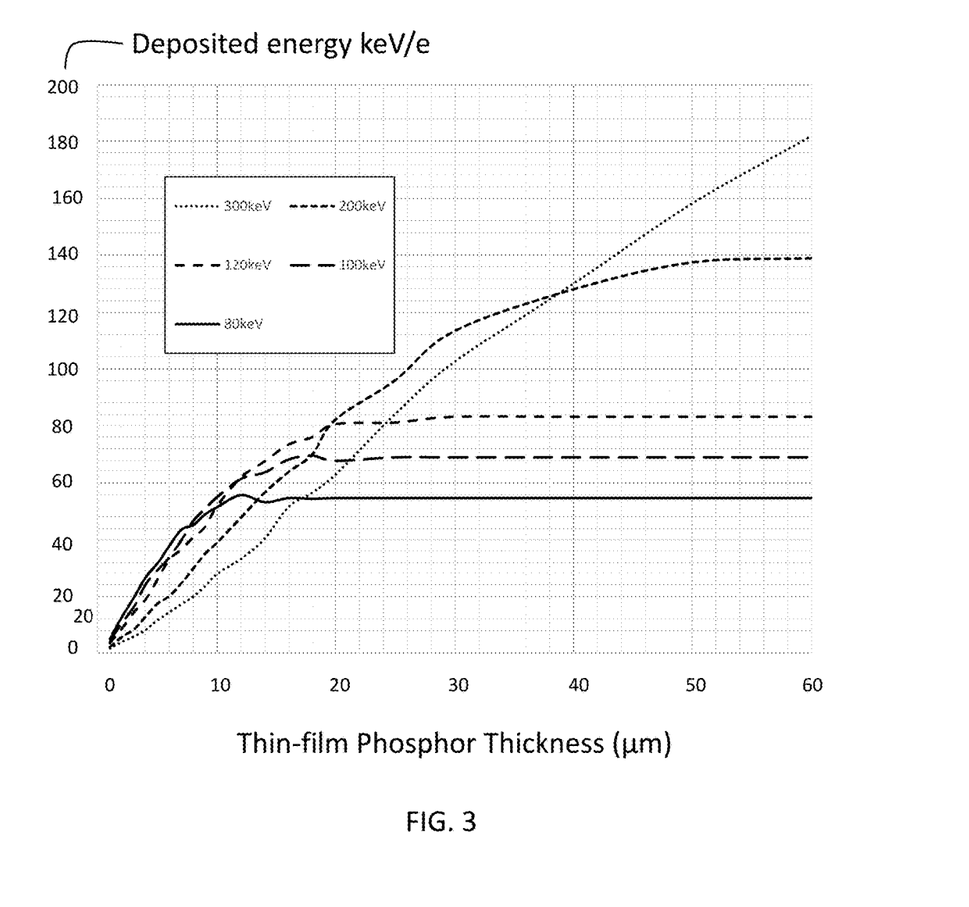
FIG. 3 is a graph of predicted deposited energy level versus thin-film phosphor thickness for an exemplary phosphor according to the invention.

One approach to reducing interaction volume is to make the scintillator as thin as possible. A disadvantage of this approach is that only a small fraction of each electron's energy is utilized in the scintillator, and that fraction grows smaller with increased energy, limiting sensitivity. This can be seen in FIG. 3, which is a simulation of deposited energy vs. thickness and indicates that the lower energies (<120 keV) approximately stop energy deposition after 12 µm to 20 µm. Note that a substantial portion of the energy is deposited in the top 10 µm of the thin film. As shown in FIGS. 2A-E, the width of the deposition in the image plane grows as the further into the scintillator the energy is deposited—hence the need for thin and dense scintillators.

Increasing scintillator thickness increases sensitivity, but also increases scattering and degrades resolution on the imaging detector. The density of the scintillator material becomes important in the case of a thin film. For a given thickness a higher density material will interact more with the electron beam than a lower density material, so the interaction volume is reduced while the resulting signal is increased. The final resolution of any sensor imaging device recording these images and patterns is determined by the combined effect of 1) scattering of the incident electrons by atoms in the scintillator material and supporting structure for the scintillator, 2) spreading and random scattering of the electron-generated photons by boundary and grain surfaces in the scintillator, 3) scintillator particle grain size and optical scatter in the film, 4) the resolution of the transfer optics from the scintillator to the sensor imaging device, and 5) the intrinsic resolution of the sensor imaging device.

Phosphors excited by electron beams typically have a light output behavior over time after the end of the electron beam exposure period with at least two recognizable parts. The first part is a fast-decaying, high intensity, portion over a primary decay time and the second part is a very slowly-decaying intensity tail, often called afterglow. For example, in a scintillator such as the often-used P-46, light intensity drops to a factor of 1/e (~37%) of the initial level within 1 µs primary decay time, but not below 1% afterglow until 100 µs has elapsed. While decay times down to ~2-3% of peak emission can be very short, below these levels the long tail decay modes predominate, and can extend decay times to 10-3000 µs for ~1% of peak emission in phosphors typically used in TEM. The tail becomes an impediment when multiple images must be made in short time frames, as in the case of in situ imaging and Scanning Transmission Electron Microscopy, "STEM" where a focused beam is raster-scanned across a sample and the signal generated at each point is recorded and then assembled into an image. An Electron Energy Loss Spectrometer may also be used in STEM to record energy spectra for each scanned point. The speed with which the electron beam can be scanned is limited by among other things, the long temporal-response tail on the scintillator phosphor.

Figure 4:
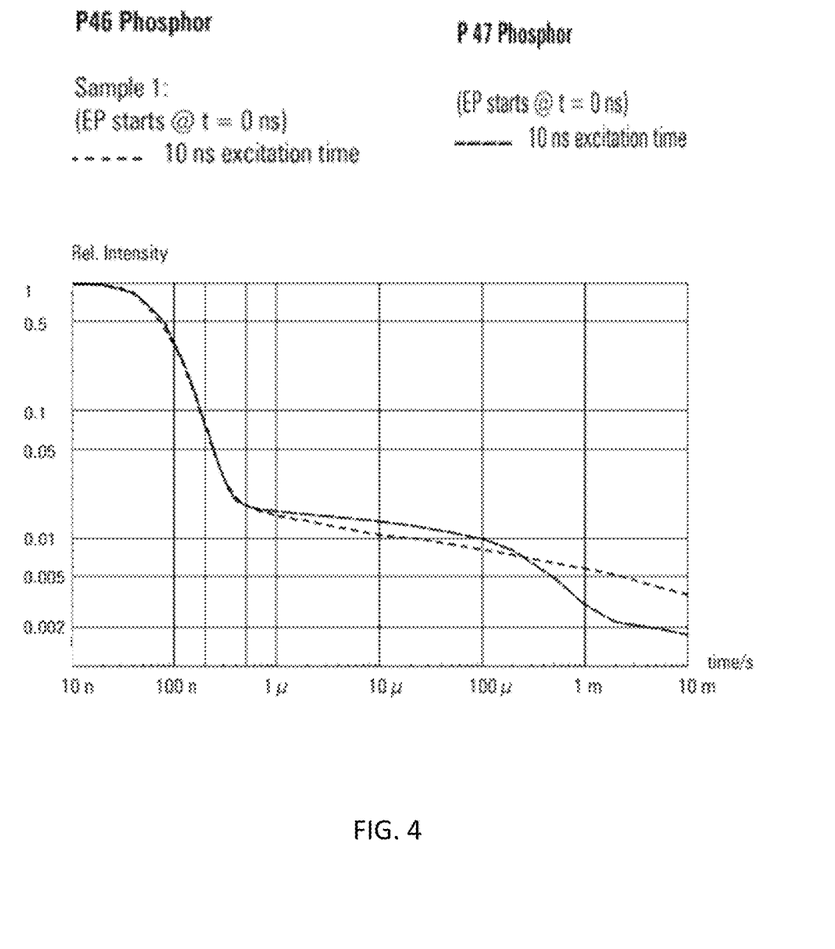
FIG. 4 shows light output vs. time for phosphors P46 and P47

A spectrum image may contain data from millions of pixels so the ability of the camera to record images or spectra at fast data rates is critical. Spectrum imaging applications are reaching data rates that challenge many of the known scintillator materials. Standard scintillator materials such P20 and P43 are used because of their high conversion efficiencies. Slow decay characteristics of these materials, however, becomes problematic in high rate measurement applications, and newer materials like P46 ($Gd_2O_2S$:Tb—300 ns decay) and P47 ($Y_2SiO_5$:Ce,Tb—100 ns decay) began to be used. Although P46 and P47 have fast decay properties, as shown in FIG. 4, these materials suffer from significantly lower efficiencies than their predecessors.

Thus, there is a need for a thin scintillator having high density, high conversion efficiency and short decay time.

DETAILED DESCRIPTION OF PREFERRED EMBODIMENTS

Those skilled in the art will recognize other detailed designs and methods that can be developed employing the teachings of the present invention. The examples provided here are illustrative and do not limit the scope of the invention, which is defined by the attached claims. The following detailed description refers to the accompanying drawings. The same reference numbers in different drawings may identify the same or similar elements.

In an aspect of the invention, a detector for electron microscopy is made of cerium-doped or praseodymium-doped, non-transparent, garnet crystalline phosphor powder comprised of particles of about 1-5 micron grain size. In a further aspect, the powder is a cerium-doped garnet of with the chemical formula of $(Gd_{1-w-x-y}Y_xLu_yCe_w)_3(Ga_{1-z}Alz)_5O_{12}$, where x<1, y=0 to 1, w=0.00067 to 0.05, and z=0 to 1. In a more particular embodiment, the cerium-doped garnet of the preceding formula is such that w is substantially 0.0067, x<1.0, y=0-1.0, and z is substantially 0.5. In an exemplary embodiment, the phosphor has a primary decay time of less than 200 nanoseconds, and less than 1% afterglow at 100 microseconds. The emission efficiency, i.e., the generated photon flux in lumens per incident beam electron, based on an equivalent thin layer geometry (i.e. about 100 μm or less), of the phosphor is greater than 25% of that of P-43.

The above definition of emission efficiency is relevant for phosphor use in electron microscopy. However, existing published data on phosphor performance often uses other energy efficiency metrics such as lumens per Watt, which refers to light output as a function of incident radiation power, or lumens per micro-Amp, which may refer to direct excitation by electron beams or to the current used in method where an X-ray source provides incident radiation to excite the phosphor. Furthermore, the results are often obtained using bulk phosphors or thick films, as opposed to a relevant thin film geometry. A suitable method of one type of energy efficiency measurement is described in *Standard Reference Phosphors for Quantum Efficiency Measurement*, Yuji International, 1250 Oakmead Parkway Suite 210 Sunnyvale, Calif. 94085. A table of efficiencies corresponding to various scintillator materials is provided below in Table 1, including the results obtained for an embodiment of the phosphor described herein. Table 1 below shows that published x-ray efficiency data shows other fast phosphors that would have greater than 25% of the light yield of P-43. However, when those phosphors are put into a thin-film geometry, their low density becomes an important effect, and the measured emission efficiency achieved is much lower than the efficiency when in a standard x-ray excitation measurement. Therefore, while published efficiencies of a phosphor may suggest sufficient performance will be obtained in the desired application, the efficiency in the desired geometry, in practice, is not sufficient.

TABLE 1

| TYPE | Composition | Published Efficiency (electron beam, 15 kV) (lm/μA) [4] | Published Efficiency; Percentage of P-43 | Density (g/cm³) | Measured thin film Emission Efficiency (electron beam, 200 kV) (Relative to P-43) |
|---|---|---|---|---|---|
| P-43 | $Gd_2O_2S$:Tb | 0.71 | 100% | 7.3 | 100% |
| P-46 | $Y_3Al_5O_{12}$:Ce | 0.25 | 35% | 4.55 | 14% |
| P-47 | $Y_2SiO_5$:Ce,Tb | 0.18 | 25% | 4.45 | 12% |
| Presently Disclosed Phosphor | Ce-doped garnet/Pr-doped garnet | No prior published data | No prior published data | 6.4 | 25-50% |

Consistent with embodiments described herein, the starting material for the garnet crystalline powder of the novel material is made by flame-spray pyrolysis producing nanoparticles with typical sizes of 10 to 80 nm. Nanoparticles can be fabricated by other means, particularly by solution and other means of combustion. The invention is not limited to the listed means for producing the starting material. The starting material nanoparticles are not highly crystalline, nanometers in size and not useful as a scintillator directly. The particles are heated in air to grow them in size and also to turn the particles into a crystallized form, which greatly enhances the light yield.

Figure 5:
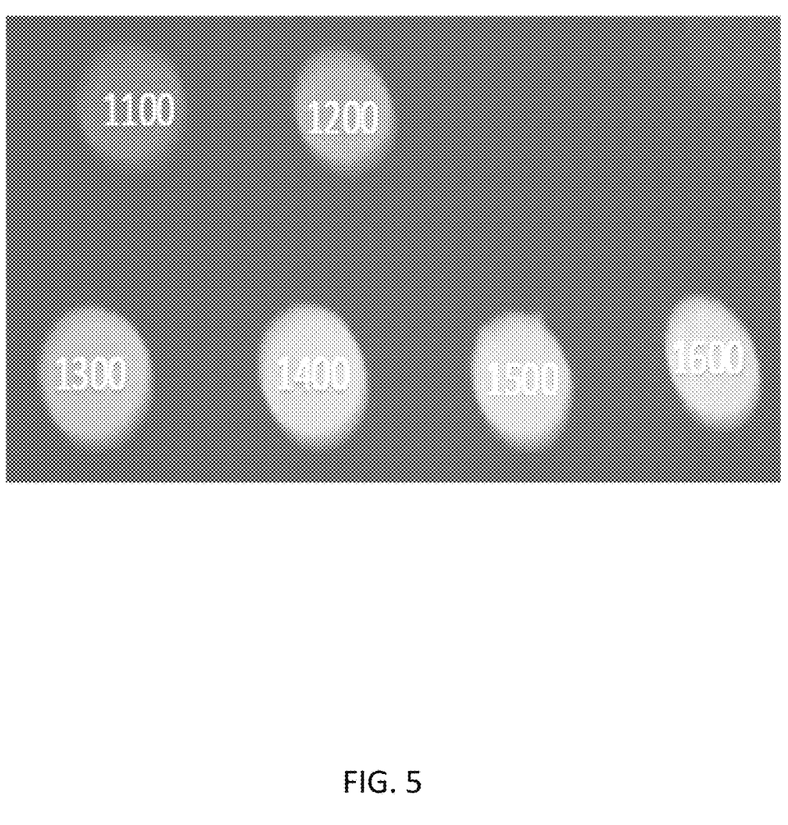
FIG. 5 is a comparison of phosphor light output for phosphors heat treated at various temperatures.

FIG. 5 shows relative light output for an exemplary Cerium-doped garnet powder in which each sample is treated to the indicated heating temperature in degrees Celsius. It can be seen from FIG. 5 that light output peaks once the material is heated to 1400° C. and that heating above that temperature in the conditioning process does not produce material additional light output. The heating step creates a material with particles sizes in the 1 to 30 micron range and forms crystals of the material. The crystallinity may be confirmed by x-ray diffraction. The heating step also can result in some agglomeration of the material. To be used as a thin film scintillator, the particle grain size should be in approximately the 1 to 10 and preferably 1 to 5 micron range and the individual particles unbound to each other. In an exemplary embodiment, the particles have a particle size distribution such that they vary in size by less than about a factor of 5.

Figure 6A:
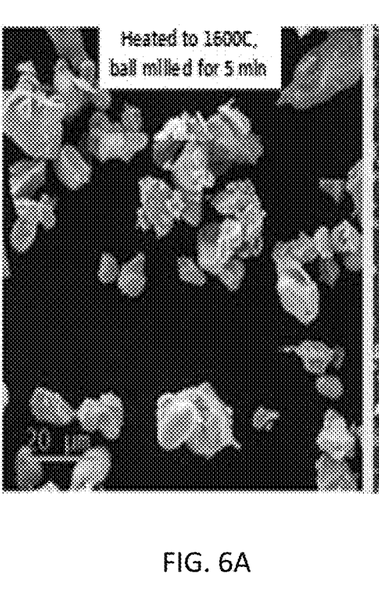
FIG. 6A shows exemplary heat-treated Cerium doped garnet particles ball milled for 5 minutes.
Figure 6B:
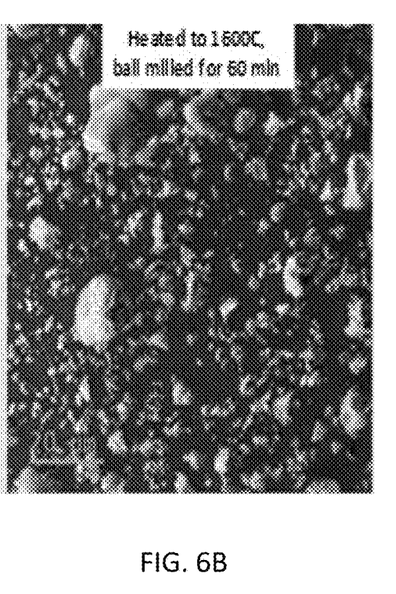
FIG. 6B shows the exemplary heat-treated Cerium doped garnet particles of FIG. 5A ball milled for an additional 60 minutes.

This reduction in size may be achieved by milling the material formed in the heating step described above. FIGS. 6A, 6B show exemplary Cerium doped garnet particles as modified by above heating step and then ball milled for 5 minutes (6A) and for 60 additional minutes (6B). Although ball milling is described above, various other methods for milling can be used consistent with embodiments described herein including ball milling, jet milling, rod milling, disc milling, cryo-milling and, pestle and mortar for example.

Figure 7:
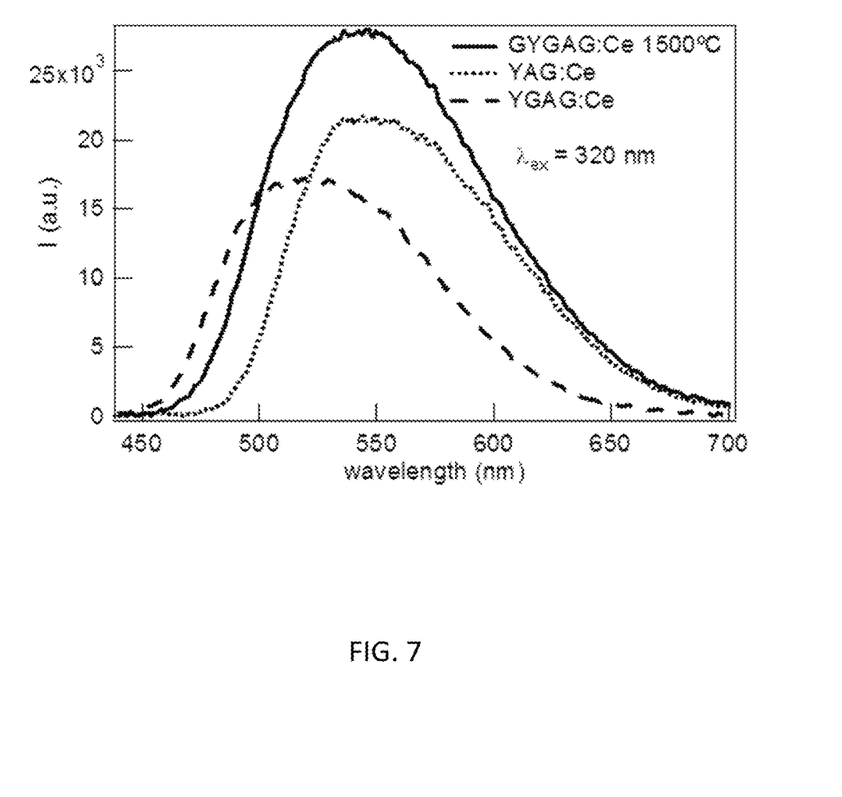
FIG. 7 is a graph of test data comparing emission spectra of an exemplary cerium-doped phosphor: GYGAG:Ce with two phosphors YAG:Ce and YGAG:Ce.

FIG. 7 shows test data for the emission spectrum of an exemplary Ce-doped garnet phosphor [$(Gd,Y)_3(Ga,Al)_5O_{12}$] according to an aspect of the invention, compared to phosphors: YGAG:Ce [$Y_3(Ga,Al)_5O_{12}$] and GYGAG:Ce [$(Gd,Y)_3(Ga,Al)_5O_{12}$]. The intensity units on the Y axis are arbitrary. The excitation is provided by ultraviolet light of wavelength 320 nm. This graph shows that the phosphors emit at different frequencies.

In further embodiments, the garnets containing Lu and Tb in addition to Gd and Y as noted exhibit similar emission spectra.

Once the phosphor material has been processed to a useful size, a thin film containing the phosphor is made. The thin film may be made by mixing the phosphor material in a liquid dispersant with a binding agent including but not limited to: sodium silicate, ethyl cellulose, ammonium polymethacrylate or cellulose nitrate. The phosphor/binder mixture is applied on top of an image processing device, which may be, for example, a fiber-optic plate as shown in FIG. 1. The film can be deposited in many ways, for example, by silk-screening or gravitational settling. In an exemplary embodiment, the final scintillator film should have a density of at least 6.0 gm/cm$^3$.

Figure 8:
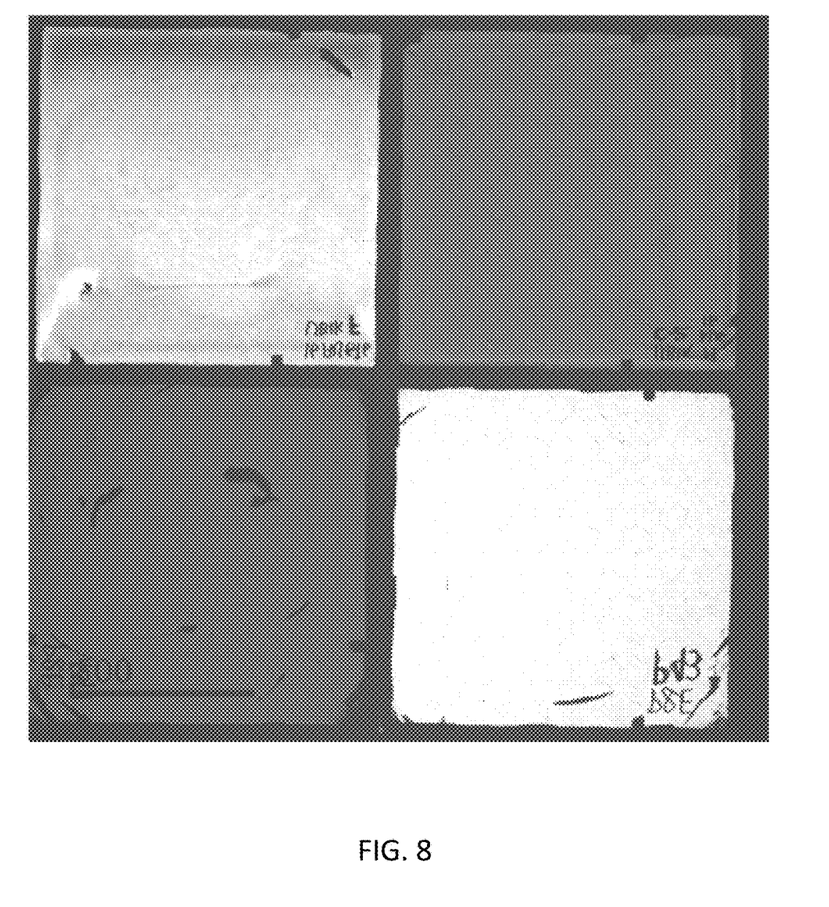
FIG. 8 shows light output from four phosphors, including two exemplary embodiments according to aspects of the invention.

FIG. 8 shows a light-yield comparison between P-47 and P-43 phosphor films (bottom two squares) and two exemplary embodiments of the cerium-doped garnet described herein (top two squares). The bottom left is a film of P-47. The bottom right is a film of P-43. The top left square is about 50% the brightness of the P-43 (bottom right) square. The top right square is about 25% of the brightness of the P-43 square. The P-47 square is about 14% the brightness of the P-43 square.

Figure 9:
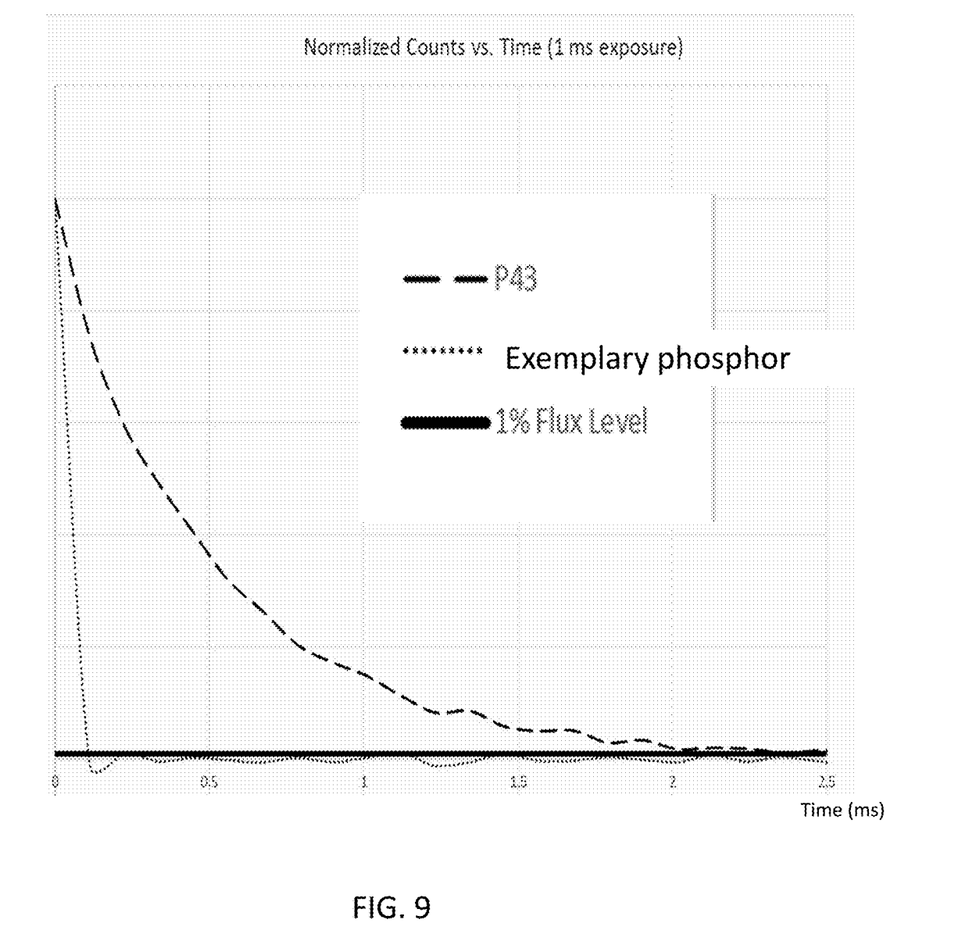
FIG. 9 is a graph of representative decay data showing the decay time to 1% for both P-43 and an exemplary phosphor according to aspects of the invention.

FIG. 9 shows a graph of representative decay data showing the decay time to 1% for both P-43 (large dashed) and an embodiment of an exemplary phosphor as described herein for a 1 ms duration 200 kV electron beam exposure. It can be seen that the P-43 light emission reaches the 1% level after about 2 ms, while an exemplary phosphor as described hererein reaches 1% in less than 0.112 ms.

Figure 10:
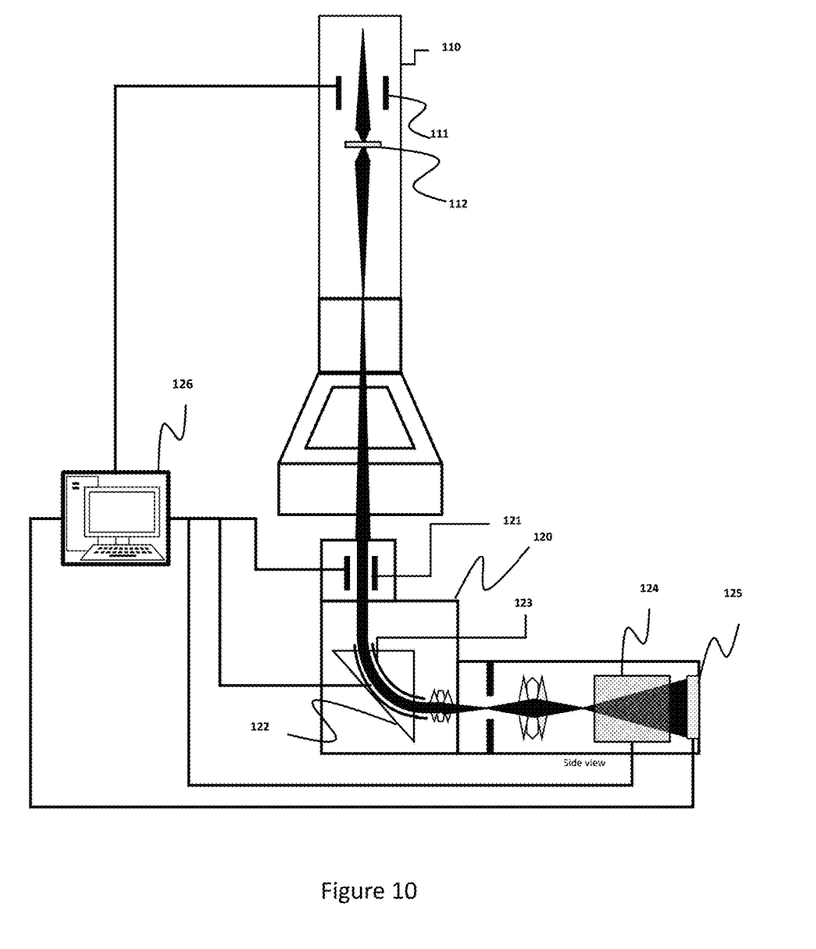
FIG. 10 is an exemplary STEM with EELS including an exemplary sensor having a thin film phosphor scintillator as described herein.

FIG. 10 is a block diagram for an exemplary Scanning Transmission Electron Microscope (STEM) equipped for Electron Energy Loss Spectroscopy and having an imaging device incorporating exemplary phosphors as described herein. An exemplary STEM includes a microscope/probe deflector 111 positioned above a specimen 112. A spectrometer 120 placed after the specimen includes one or more beam blankers 121, an energy-dispersing prism 122, one or more energy shifters 123, one or more spectrum deflectors 124, and an image-receiving sensor 125 comprising a scintillator made according to the processes described herein and using the phosphors described herein. One or more microcontrollers or computers 126 are connected to and control the deflectors 111, beam blankers 121, energy shifters 123 and spectrum deflectors 124 and are connected as well as to the image sensor 125 to receive the image produced by it. In a system such as this, the image sensor may be readout at speeds of 1000 frames per second or greater.

Figure 11:
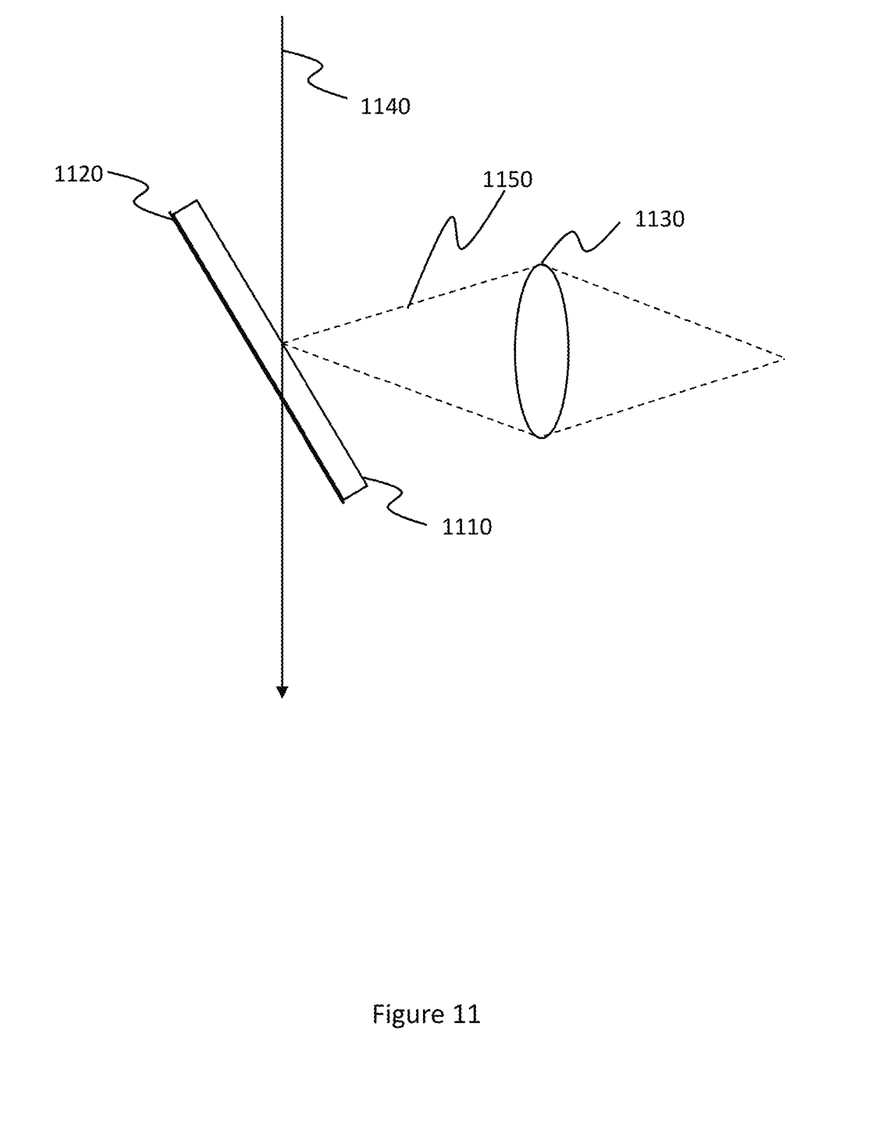
FIG. 11 is a diagram of an exemplary system for optically imaging a thin-film phosphor mounted on a thin substrate.

In a further embodiment, one or more of the phosphors described herein may be supported on a thin substrate and light generated by the phosphors is imaged via optical elements. FIG. 11 is a simplified diagram of an exemplary system comprising a thin substrate 1120 to which is applied a phosphor layer 1110. The combined substrate/phosphor is inserted in the path of an electron beam 1140. Light 1150 produced by the phosphor layer 1110 is focused by one or more optical lenses 1130. The substrate may be a film or a screen. Preferred materials for the substrate have a low atomic number to reduce scattering of the incident electron beam and are as transparent as possible to electrons. Exemplary materials include a beryllium metal film or a polymer film, each of which have elements with low atomic numbers.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A thin film sensor for emitting light when excited by an electron beam, comprising:
   a cerium-doped or praseodymium-doped, non-transparent, garnet crystalline phosphor powder comprised of particles having a grain size substantially between 1 and 5 microns,
   wherein the thin film sensor has a thickness of 100 μm or less, said phosphor having a light output primary decay time to less than a factor of 1/e (~0.37) of peak light emission at 1 microsecond or less after excitation by the electron beam has ceased, and said phosphor having an emission efficiency equal to or greater than 25% of phosphor P-43.

2. The thin film sensor of claim 1, wherein said phosphor exhibits an afterglow of less than 1% of peak light emission intensity at 100 microseconds or less after excitation by the electron beam has ceased.

3. The thin film sensor of claim 1 wherein said phosphor powder has a density of about 6.0 gm/cm$^3$.

4. The thin film sensor of claim 1 wherein said phosphor powder comprises particles heat-treated at greater than 1400 degrees Celsius and said heat-treated particles exhibit crystallinity in garnet phase as determined by x-ray diffraction.

5. The thin film sensor of claim 1, wherein said heat-treated particles are milled to reduce average particle size to less than about 5 μm.

6. The thin film sensor of claim 5, wherein said milling comprises attrition milling, ball milling, cryo-milling or jet-milling.

7. The thin film sensor of claim 5, comprising particle agglomerates substantially greater than about 1 micron and less than about 10 micron after said milling.

8. The thin film sensor of claim 5, wherein said particles vary in size by no more than a factor of 5.

9. The thin film sensor of claim 1, wherein said phosphor has the chemical formula of: $(Gd_{1-w-x-y}Y_xLu_yCe_w)_3(Ga_{1-z}Al_z)_5O_{12}$, where x<1, y=0 to 1, w=0.00067 to 0.05, and z=0 to 1.

10. The thin film sensor of claim 9, wherein w is substantially 0.0067, and z is substantially 0.5.

11. The thin film sensor of claim 9, further comprising:
a fiber-optic faceplate or thin substrate,
wherein said phosphor is structurally bound to the fiber-optic faceplate or thin substrate.

12. The thin film sensor of claim 11 wherein said phosphor is structurally bound to said fiber-optic faceplate or thin substrate with sodium silicate, ethyl cellulose, ammonium polymethacrylate, or cellulose nitrate.

13. An electron beam sensor comprising the thin film sensor of claim 11, the electron beam sensor further comprising:
an optical detector array image sensor configured to receive light from the thin film sensor.

14. An electron beam sensor of claim 13, wherein the optical detector array image sensor is configured to be read out at 1000 frames per second or greater.

15. A thin film sensor for emitting light when excited by an electron beam, comprising:
a cerium-doped or praseodymium-doped, non-transparent, garnet crystalline energy conversion phosphor powder, comprised of particles having a grain size substantially between 1 and 5 microns,
said phosphor having a light output primary decay time to less than a factor 1/e (~0.37) of peak light emission at 1 microsecond or less after excitation by an electron beam has ceased and having an emission efficiency in a thin film sensor equal to or greater than 25% of phosphor P-43.

16. The thin film sensor of claim 15, wherein said phosphor exhibits an afterglow of less than 1% of peak light emission intensity at 100 microseconds or less after excitation by the electron beam has ceased.

17. The thin film sensor of claim 15 having a density of about 6.0 gm/cm$^3$.

18. The thin film sensor of claim 15 wherein said particles are heat treated at greater than 1400 degrees Celsius and said heat-treated particles exhibit crystallinity in garnet phase as determined by x-ray diffraction.

19. The thin film sensor of claim 15, wherein said particles are milled to reduce average particle size to less than about 5 μm.

20. The thin film sensor of claim 19, wherein said milling comprises attrition-milling, ball-milling, cryo-milling or jet-milling.

21. The thin film sensor of claim 19 wherein said particle agglomerates are greater than about 1 micron but less than about 10 micron after said milling.

22. The thin film sensor of claim 21 wherein said particles vary in size by no more than a factor of 5.

23. The thin film sensor of claim 15 wherein said phosphor has the chemical formula of: $(Gd_{1-w-x-y}Y_xLu_yCe_w)_3(Ga_{1-z}Al_z)_5O_{12}$, where x<1, y=0 to 1, w=0.00067 to 0.05, and z=0 to 1.

24. The thin film sensor of claim 23 wherein w is substantially 0.0067, and z is substantially 0.5.

25. A method of preparing the thin film sensor of claim 15 comprising:
producing nanoparticles of the phosphor powder by flame-spray pyrolysis;
heat-treating said nanoparticles in air to grow them in size and turn the particles into a crystallized form;
confirming crystallinity of said heat-treated nanoparticles by x-ray diffraction;
milling said heat-treated nanoparticles to a size between 1 and 10 microns;
forming a thin film by mixing the phosphor material in a liquid dispersant with a binding agent; and
depositing said thin film on an optical element, a thin substrate or directly to an image sensor.

* * * * *